United States Patent [19]
Kwon

[11] 3,944,486
[45] Mar. 16, 1976

[54] PROCESS FOR TREATING SULFIDE-CONTAINING MATERIALS

[75] Inventor: Joon Taek Kwon, Freehold Township, N.J.

[73] Assignee: The Lummus Company, Bloomfield, N.J.

[22] Filed: Jan. 15, 1973

[21] Appl. No.: 323,407

[52] U.S. Cl. .................... 210/59; 210/69; 423/164; 423/563; 423/638
[51] Int. Cl.² ......................................... C01F 11/10
[58] Field of Search ............. 210/42, 43, 45, 47, 50, 210/51, 56, 59, 60, 69; 423/158, 164, 635, 640, 562, 168, 563, 638, 572

[56] References Cited
UNITED STATES PATENTS

| | | | |
|---|---|---|---|
| 1,580,452 | 4/1926 | Sperr | 423/563 |
| 2,118,353 | 5/1938 | MacIntire | 423/164 |
| 2,374,632 | 4/1945 | Walker | 423/164 |
| 2,709,126 | 5/1955 | Gollmar | 423/158 |
| 3,625,164 | 12/1971 | Spector | 423/168 |

Primary Examiner—Charles N. Hart
Assistant Examiner—Peter A. Hruskoci
Attorney, Agent, or Firm—Marn & Jangarathis

[57] ABSTRACT

A process for recovering the calcium values and sulfide values from a calcium sulfide-containing material is disclosed. The calcium sulfide-containing material dispersed in an aqueous medium is digested in the presence of hydrogen sulfide under conditions to provide a mole ratio of $S^{--}/Ca^{++}$ of between 1.5 and 2.0. After filtration to remove undissolved solids, the mother liquor is stripped with an inert gaseous medium, e.g. nitrogen, steam, etc., whereby hydrogen sulfide is stripped therefrom with the concomitant formation of calcium hydroxide which is subsequently separated by filtration. The gaseous overhead from the stripping operations may be fractionated to form a recycleable hydrogen sulfide-containing stream.

5 Claims, 1 Drawing Figure

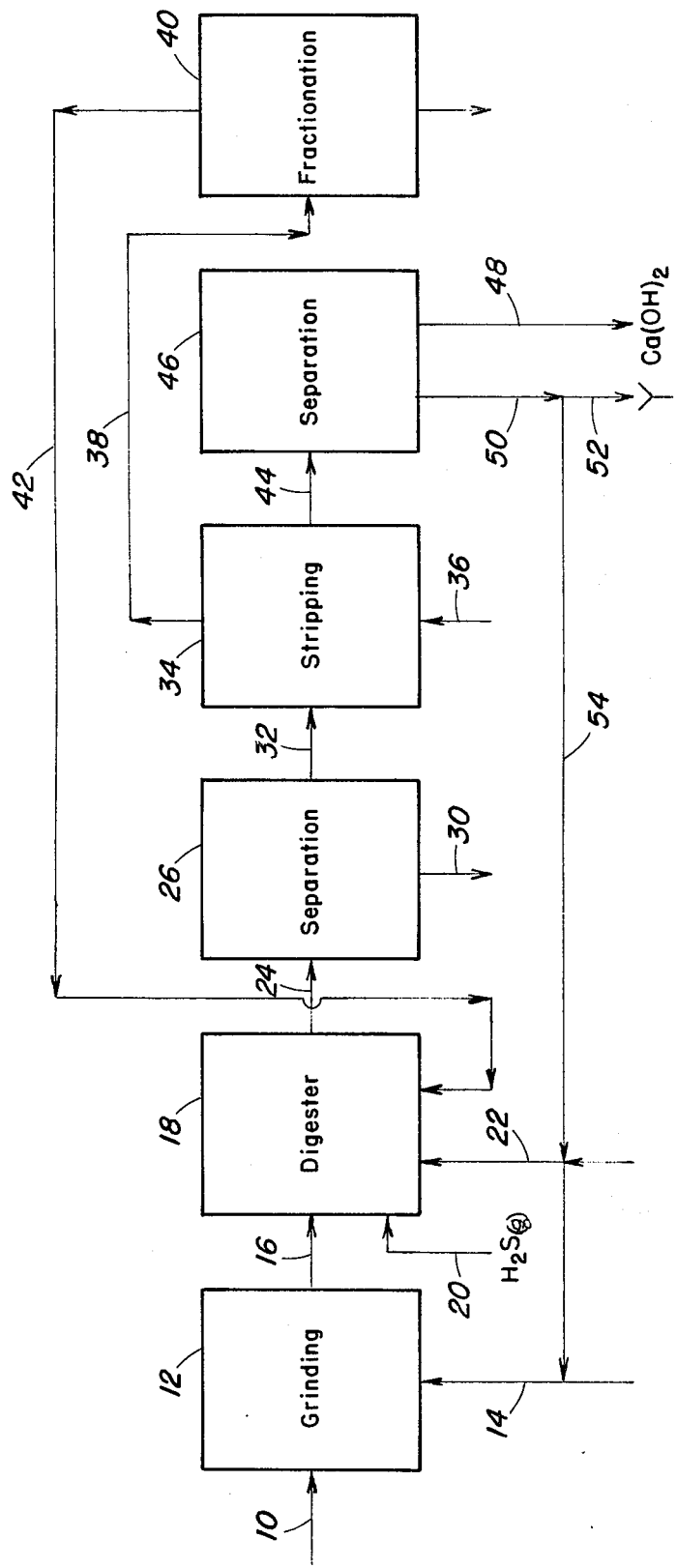

PROCESS FOR TREATING SULFIDE-CONTAINING MATERIALS

BACKGROUND OF THE INVENTION

This invention relates to a process for recovering metal values from a sulfide-containing material, and more particularly to a process for the recovery of calcium and sulfide values from a calcium sulfide-containing material, such as slag produced in a blast furnace.

Many processes for handling slag and like materials to recover calcium values have been advanced, but have met with limited acceptance. In one such process, slag (a CaS/Ca(OH)$_2$ mixture) is contacted with weak caustic solutions for a prolonged period of time at temperatures of about 200°F. whereby a significant amount of the lime is recovered. The sulfur values, however, as sodium polysulfide remain in solution and are disposed of by passing such a solution including entrained ash as waste to disposal. In another process, slag is pyrolized in the presence of gypsum and controlled amounts of oxygen with sulfur values being recovered as sulfur dioxide contained in the off-gas. In such latter process, no provision is made for the separation of ash.

The capacity of calcium oxide as a sulfur acceptor has long been recognized in the metallurgical art, e.g. in the production, inter alia, of iron, copper and the like. Recently, such capacity has found applicability in fuel gasification processes, such as described in a brochure published by the American Chemical Society in 1967 entitled "Fuel Gasification" wherein calcium oxide in the solid state is used in a fluidized bed system. In U.S. Pat. No. 3,456,622 to Thornton et al. and assigned to the assignee of the present application, there is disclosed a process for removing the sulfur values from a flue gas using a solution of calcium carbonate. In order to permit such processes to be competitive, other than by legislative action, it is necessary to have an efficacious and facile process for the regeneration of the initial calcium compound from a sulfide-containing compound thereof.

OBJECT OF THE INVENTION

An object of the present invention is to provide a novel process for recovering calcium values from a calcium sulfide-containing material.

Another object of the present invention is to provide a novel process for recovering calcium values from a calcium sulfide-containing material in a cyclic process.

Still another object of the present invention is to provide a novel process for recovering calcium values from a calcium sulfide-containing material together with sulfur values in a convenient form for storage and handling with corresponding ecological beneficence.

A further object of the present invention is to provide a novel process for treating calcium sulfide-containing materials to obtain products which may be stored in the open and which exhibit better weathering behavior than untreated slag.

SUMMARY OF THE INVENTION

These and other objects of this invention are achieved by digesting particulate calcium sulfide-containing material in an aqueous medium in the presence of hydrogen sulfide under conditions to provide a mole ratio of $S^{--}/Ca^{++}$ of more than 1.5 and less than 2.0 to convert calcium sulfide to the more soluble forms of the sulfides, such as the hydroxyhydrosulfides with the simultaneous formation of insoluble sulfides of the heavy metals, such as ash, silicates and like insoluble materials of improved storage behavior. After separation of the sulfides of the heavy metals, the mother liquor is contacted with a stripping medium, such as steam, to strip out hydrogen sulfide while precipitating calcium hydroxide substantially free of sulfur. The calcium hydroxide may be treated into recycleable assays or material of much improved storage behavior.

BRIEF DESCRIPTION OF DRAWINGS

Further objects and advantages of the invention will become apparent upon consideration of the detailed disclosure thereof, especially when taken with the accompanying drawings illustrating a schematic flow diagram therefor. It is to be understood that equipment, such as pumps, valves, indicators, and the like have been omitted from the drawing to facilitate the description thereof and the placing of such equipment at appropriate places is deemed to be within the scope of those skilled in the art. Additionally, while the present invention is described with references to the treatment of a CaO/CaS system derived from a slag formed in an iron reduction process, it is understood that any CaO/CaS system to be treated may be derived from other processes, e.g. a fuel gasification process, a flue gas treating process, and other metallurgical processes, and that other metal oxide/metal sulfide systems may exist. Generally, any metal oxide/metal sulfide system may be treated provided that the more soluble hydroxyhydrosulfides and bisulfides of the metal are formed. Such metals include the metals of Group IIa with possible application to others such as aluminium, arsenic, germanium, mercury, nickel, tin and titanium.

Referring now to the drawings, a calcium sulfide-containing material, e.g. slag withdrawn from a blast furnace (not shown) and suitably cooled is introduced by line 10 into a granulator, generally indicated as 12, to particularize the material. An aqueous medium or recycled liquor, as hereinafter more fully discussed, is introduced into the granulator 12 by line 14 to facilitate formation of the particulate material. The particulate material is passed by line 16 to a digester, generally indicated as 18, and is treated in an aqueous medium with hydrogen sulfide introduced by line 20 under conditions to provide in the digestion liquor a mole ratio of $S^{--}/Ca^{++}$ of more than 1.5 but less than 2.0. Digestion is effected with agitation for from about 30 to 120 minutes, preferably from 45 to 60 minutes, at a temperature of from about 32° to 215°F, preferably about 120°F to about 160°F, under an atmosphere of H$_2$S at about 14.7 psia whereby calcium sulfide contained in the starting material is converted to various forms of the calcium hydroxyhydrosulfides with the simultaneous formation of insoluble sulfides of heavy metals. The best results were obtained at about 140°F. Recycled liquor in line 22 may be introduced into the digester 18 to maintain a concentration of material such that the liquid phase is nearly saturated with respect to the calcium content at the $S^{--}/Ca^{++}$ ratios hereinabove mentioned.

It is necessary to operate under conditions whereby the $S^{--}/Ca^{++}$ mole ratio is below 2.0 since operation above such ratio favors formation of calcium bisulfide which has an inverse solubility product with regard to temperature. Additionally, the concentration of solids should be about 25 parts per 100 parts of water, or be at levels as dictated by the economics of the operation.

The reactant mixture withdrawn by line 24 from digester 18 is passed to a separation zone, generally indicated as 26, wherein the aqueous liquor is separated, such as by filtration, decantation or the like from a solids fraction including ash, the insoluble sulfides and any undissolved lime which is withdrawn from the separation zone 26 by line 30 for storage or subsequent processing (not shown). The mother liquor from the separation zone 26 is passed by line 32 into a stripping zone, generally indicated as 34, and contacted with an inert stripping medium, such as steam, in line 36 to strip substantially all of the hydrogen sulfide therefrom (except for the designed sulfur level in the stripping residue) with the simultaneous formation of calcium hydroxide.

A gaseous stream including hydrogen sulfide and excess stripping medium is withdrawn by line 38 and passed to a fractionation unit, generally indicated as 40, wherein a substantially pure hydrogen sulfide containing stream in line 42 may be recovered and recycled to the digester 18. The gaseous stream in line 38 may be treated in a conventional Claus process to convert the hydrogen sulfide to elemental sulfur and water. Use of an inert stripping medium, such as nitrogen, steam, etc., readily permits the separation and recovery of a recycleable hydrogen sulfide stream, as compared with the use of a stripping gas including carbon dioxide or like acid gases which is difficult to separate from hydrogen sulfide and which would be deleterious to digestion.

The stripped aqueous solution including suspended calcium hydroxide is withdrawn by line 44 from the stripping zone 34 and is passed to a separation zone, generally indicated as 46, wherein the said solid fraction including calcium hydroxide is separated from the mother liquor. The solid fraction is withdrawn from the separation zone 46 by line 48 and is passed to storage or subsequent processing units (not shown) for the production of lime which may be recycled as a sulfur acceptor or as flux to a blast furnace. The calcium hydroxide recovered by the present process is a substantially more effective sulfur-acceptor as compared with calcium carbonate (or calcium oxide by the pyrolysis of calcium carbonate). The mother liquor withdrawn from separation zone 46 by line 50 is passed to waste by line 52 since the concentration of dissolved solids is low, or a portion thereof may be passed by line 54 as the recycled liquors in lines 14 and 22 as hereinabove discussed.

EXAMPLES OF THE INVENTION

The following examples are illustrative of conditions for the process of the invention and it is to be understood that the scope of the invention is not to be limited thereby.

EXAMPLE I

A highly volatile bituminous coal (−200 mesh) containing 3.72% sulfur is reacted with calcium oxide and calcium oxide/calcium sulphate at a temperature between about 2,000° to 2,100°F. under standard conditions for coal gasification. Calcium oxide is converted to calcium sulfide and calcium carbonate with calcium sulphate being reduced to calcium sulfide by the carbon in the coal. The resulting material had the following composition:

| Component | Wt. % |
|---|---|
| CaS | 9.88 |
| $CaSO_4$ | 0.22 |
| Ash (insoluble) | 41.78 |
| $CaO/CaCO_3$ | 48.12 |
| | 100.00 |

3.92 grams of the material in 35.0 ml of water are slurried under 20 psia. of hydrogen sulfide for two hours and filtered to provide 2.47 grams of a residue containing 0.25% sulfur. Thus, 96% of the sulfur as sulfide is digested. The filtrate is stripped with nitrogen for 2 hours and dried almost to dryness yielding a yellowish white precipitate containing 4.91% sulfur and 91% calcium hydroxide accounting for 87% of the calcium values in the starting material. The amount of sulfur remaining in the residue amounted to 6.8% of the sulfur bound to calcium in the digestive liquor, or 42% of the sulfur originally present as calcium sulfide in the char-coal composition.

EXAMPLE II

A digested slurry having in part the following composition was subjected to batch steam stripping under nitrogen flow.

| Composition | Wt. % |
|---|---|
| S (combined) | 13.7 |
| CaS | 20.5 |

The $H_2O/H_2S$ mole ratio in the distillates is 2–3 at 20% net solids content and 1.5–2 at 25% net solids content in the pot. These ratios remained constant to about 65–70% recovery of sulfur. The residual liquor contained 1.11 to 1.20% sulfur and 1.58% solids (as CaS). The buff-white residue contained 0.13% sulfur. At least 75% of the weight of $Ca(OH)_2$ was recovered as flakes and powder.

EXAMPLE III

The following Table I illustrates the ability to separate calcium sulfide from a coal ash digested with aqueous hydrogen sulfide.

Table I

| Components | Before Digestion (Ash) | | After Digestion | |
|---|---|---|---|---|
| | wt.% | g. | wt.% | g. |
| Sulfide sulfur | 4.30 | 0.17 | 0.25 | 0.0062 |
| Sulfate sulfur | 0.05 | 0.002 | | |
| Acid insolubles | 48.13 | 1.89 | 99.75 | 2.46 |
| Acid solubles | | | | |
| ($CaO + CaCO_3$) | 47.43 | 1.86 | | |
| Totals | 100.00 | 3.92 | 100.00 | 2.47 |

Difference in total weight represents calcium oxide/calcium sulfide in the original ash. About 96% of the sulfide originally present in the ash was removed by the process of this invention. The sulfur values included within the calcium sulfide-containing material may also be recovered by stripping and passing the overhead sulfide stream to a conventional Claus system to form elemental sulfur and water as hereinabove described. Further as discussed hereinabove, since the residual liquid in the stripper is extremely low in its content of dissolved solids, the liquid may be recycled either to the granulator and/or digester. Additionally, the precipitated lime may be recycled to a blast furnance where such precipitated form of lime is more reactive, i.e., as a sulfur acceptor than the conventionally used calcined form.

While the invention has been described in connection with several examplary embodiments thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

I claim:

1. A process for recovering sulfur and calcium values from a material containing calcium sulfide, comprising:
    digesting said material containing calcium sulfide in an aqueous medium at a temperature of from 32°F to 215°F in the presence of an atmosphere of hydrogen sulfide to produce an aqueous solution of calcium hydroxyhydrosulfide having a mole ratio of sulfide ions to calcium ions of more than 1.5 and less than 2.0;
    separating insoluble sulfide material from the aqueous solution of calcium hydroxyhydrosulfide; and
    contacting said aqueous solution of calcium hydroxyhydrosulfide with an inert gaseous stripping medium to recover sulfur values as hydrogen sulfide and calcium values as calcium hydroxide.

2. The process of claim 1 wherein the digestion is effected at a temperature from about 120°F to about 160°F.

3. The process of claim 1 wherein the digestion is effected for a time from about 30 to about 120 minutes.

4. The process of claim 1 wherein the inert stripping medium is steam.

5. The process of claim 4 wherein the hydrogen sulfide atmosphere is at about atmospheric pressure.

* * * * *